(No Model.)
N. A. VELINE.
MECHANICAL MOVEMENT.
No. 290,372. Patented Dec. 18, 1883.
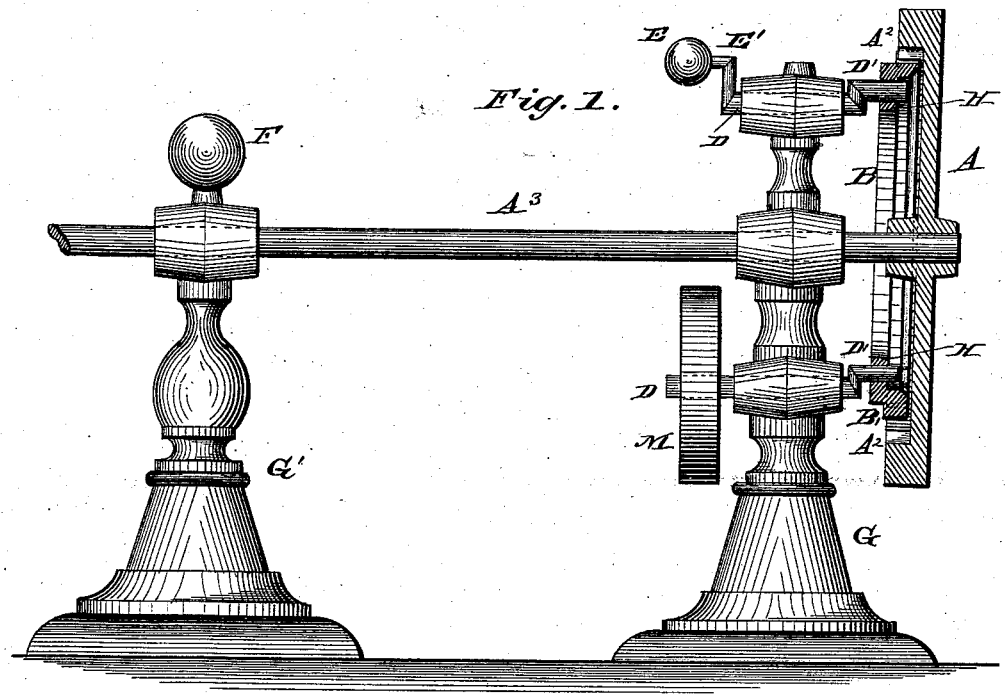
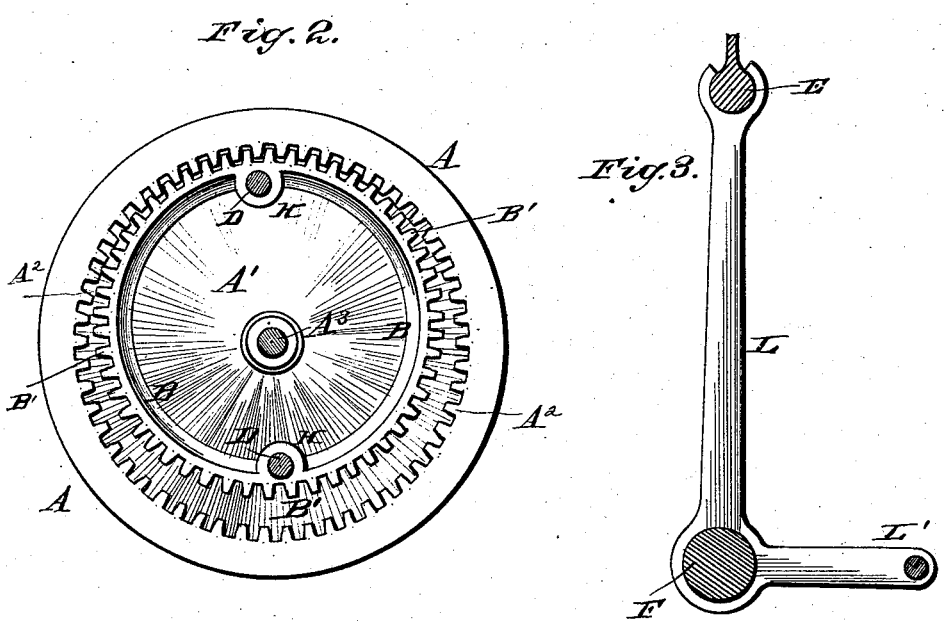
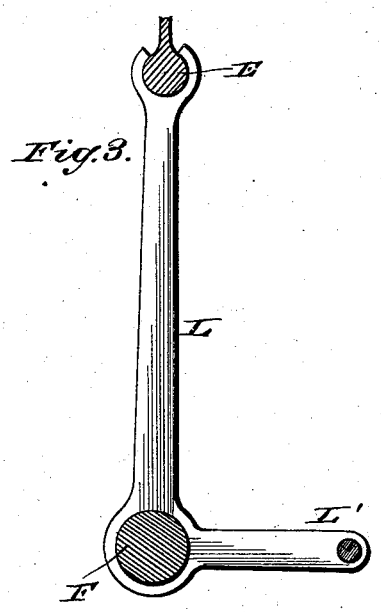
WITNESSES
INVENTOR

UNITED STATES PATENT OFFICE.

NELS AUGUST VELINE, OF VILLISCA, IOWA.

MECHANICAL MOVEMENT.

SPECIFICATION forming part of Letters Patent No. 290,372, dated December 18, 1883.

Application filed October 16, 1883. (No model.)

*To all whom it may concern:*

Be it known that I, NELS AUGUST VELINE, a citizen of the United States, residing at Villisca, in the county of Montgomery and State of Iowa, have invented certain new and useful Improvements in Mechanical Movements; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention pertains to improvements in mechanical movement, and has for its objective point an increase of velocity without the usual interposition of intermediate gearing.

In the drawings, Figure 1 is a side elevation of mechanism embodying my invention. Fig. 2 is a view of the inner face of the drive-wheel A in its relations to the annular rim B. Fig. 3 is a detached view of the bell-crank lever L.

The invention is applicable to all cases in which a rotary power is used to drive a reciprocating bar; and it may also be applied to increase the velocity in a rotary movement.

A is a dish-shaped wheel, having a concave face, A', an inwardly-projecting series of cogs, $A^2$, near its periphery, and rigidly keyed on the shaft $A^3$. In the case of reapers and mowers the shaft $A^3$ may be the axle of the carrying-wheels of the machine, rotated by the traction of such wheels.

G is a stanchion, in which are journaled at proper altitudes, the one above the other, the horizontal short revolving shafts D D. On the outer ends of the shafts D D, respectively, are formed the cranks D', the outer ends or wrists of which are loosely seated in the annular rim B at H, so as to rotate in such rim without revolving the latter. The rim B is provided on its exterior with a series of cogs, B', fitted to engage the series of cogs $A^2$ of the wheel A. The rim B encircles the shaft $A^3$, but does not come in contact therewith. As the wheel A is rotated its cogs engage those of the rim B, and thereby cause a rotation of the short shafts D D. The transverse diameter of the rim B is less than and is in a certain proportion to that of the circle within the cogs $A^2$. The annular space within the cogs $A^2$ must be of sufficient diameter to allow of the orbital motion of the rim B, consequent upon the rotations of the shafts D D. The impact of the cogs $A^2$ upon the cogs B' of the rim B does not revolve the latter; but the necessary rotation is furnished by the shafts D D, turning at once on their own centers and in the rim B. The sole motion, therefore, of the rim B is an orbital one, the center of the axle $A^3$ being the center of such orbit, and the latter being coincident with the circuit of crank-wrist. The orbit traversed by the rim B is so much less than the circumference of the cogs $A^2$ that the shafts D revolve many times to the one revolution of the shaft $A^3$. In the machine with which I have experimented the wheel A had sixty-one cogs and the rim B fifty-six cogs. In such machine the shafts D made twelve revolutions to one of the shaft A. The shaft D is therefore driven at a velocity much greater than that of the wheel A.

F is a ball placed rigidly on the stanchion G', and fitted to form the fulcrum of the bell-crank lever L, one end of which clasps the ball E on the crank-wrist E', formed on the inner end of the upper shaft D, and the other end, L', calculated for attachment to any reciprocating bar or pitman—a mower or reaper sickle, for instance. The rotation of the shaft D imparts to the upper end of the lever L a rotary movement, which, by means of the joint connection at E and F, is converted at the lower end, L', of the lever L into an oscillating motion. The length of stroke of the end L' can be increased or diminished by varying the relative lengths of the lever L.

The ball F may be placed on the shaft $A^3$ by being keyed thereon at either side against longitudinal movement, in which case the stanchion G' can be dispensed with.

One axle D, or any number thereof, can be used.

M represents a band or gear wheel for attachment to machinery where a rotary motion is required.

The upper end of the bar L may be attached directly to the inner side of the rim B, if preferred.

The outer crank on the shaft D may be made of any desired size, so that the space within the cogs $A^2$ be of sufficient area to permit the rim B to describe the circle of such crank.

It is obvious that very rapid oscillation of the end L' of the lever L can be attained in my aforesaid invention.

In my machine the relative rotations of the shafts D and $A^3$ are twelve to one, which gives twenty-four oscillations of the lever end L' to one rotation of the wheel A. A proportionate increase of velocity is given to the wheel M.

The wheel A can be rotated by being rigidly seated on the axle of the carrying wheel or wheels of reapers or mowers, or it may be run by a belt, gear, a pitman attachment, or in any other obvious mode.

What I claim as my invention, and desire to secure by Letters Patent of the United States, is—

1. The combination of the wheel M, shaft D, rim B, and wheel A, substantially as shown, and for the purpose described.

2. The lever L, fulcrumed on the ball F, in combination with the shaft D, rim B, and wheel A, substantially as shown, and for the purpose named.

3. As a means for procuring velocity, the wheel A, provided with interior cogs, $A^2$, and either loosely or rigidly attached to the shaft $A^3$, in combination with the eccentrically-pivoted rim B and the lever L, the latter either mediately or immediately attached to the side of such rim, substantially as shown, and for the purpose described.

In testimony whereof I affix my signature in presence of two witnesses.

NELS AUGUST VELINE.

Witnesses:
WALTER N. HASKELL,
S. W. MOUNTZ.